Patented May 10, 1938

2,116,552

UNITED STATES PATENT OFFICE 2,116,552

CATALYTIC HYDROGENATION OF CARBOXYLIC ACIDS, THEIR ESTERS AND ANHYDRIDES

Herrick R. Arnold, Elmhurst, and Wilbur A. Lazier, New Castle County, Del., assignors to E. I. du Pont de Nemours & Company, Wilmington, Del., a corporation of Delaware No Drawing. Application March 6, 1936, Serial No. 67,506

21 Claims. (Cl. 260—156)

This invention relates to the preparation and use of improved contact masses for catalytic reactions. More particularly it relates to the preparation of modified ferrous metal catalysts and their use in the hydrogenation of carboxylic compounds. Specifically the invention relates to improvements in the hydrogenation of fatty acids to the corresponding alcohols.

The metals of the ferrous group comprising the elements iron, cobalt, and nickel, have long been known as catalysts for various organic reactions and have been the subject of numerous patents and other publications. As the result of an extended series of studies carried out in the vapor phase, Sabatier and his co-workers have characterized these metals as catalysts for the hydrogenation and dehydrogenation of a wide variety of organic compounds. These investigators found that nickel and its compounds were by far the most active catalysts of the group, with cobalt and iron following in the order named. Many and varied applications of these metals as catalysts have since been developed, despite the fact that their prolonged use is often rendered difficult on account of poisoning and a tendency to sinter at the higher temperatures. The use of nickel as a catalyst in the vapor phase is further complicated by the specific tendency of this element to bring about splitting of carbon-carbon bonds with the resultant degradation of useful products to carbon and gaseous hydrocarbons. Other difficulties have been encountered in the use of iron and cobalt owing to the relatively high temperatures required for activation which renders them inapplicable for many reactions that proceed best at temperatures below 400° C.

This invention has as an object an improved method for catalytically hydrogenating carboxylic compounds by the use of modified ferrous metal catalysts such as are described in copending application, Serial No. 629,306, filed Aug. 18, 1932, now Patent #2,047,945 dated July 21, 1936. A particular object is an improved method for catalytically hydrogenating carboxylic acids. Other objects will appear hereinafter.

These objects are accomplished by the use in the hydrogenation of carboxylic compounds either in the vapor or liquid phase, of catalysts consisting substantially of the ferrous metals or their compounds in which have been incorporated small amounts of one or more relatively low-melting hydrogenating metals of the non-ferrous type whose oxides are easily reducible, whereby the severity of action typical of the ferrous metals, particularly nickel, in splitting carbon-carbon bonds is decreased without substantially impairing its activity toward the hydrogenation of the carboxyl groups.

In the following examples there are described several catalyst compositions prepared in accordance with this invention, together with instances of their application to the hydrogenation of carboxylic compounds and comparative data showing the advantages to be gained through following the teachings of this invention.

Example I

The modified ferrous metal catalysts are applicable to the process of hydrogenating carboxylic acids and their derivatives as demonstrated in the following example:

A cadmium-modified nickel catalyst supported on kieselguhr was prepared as follows—522 grams of nickel nitrate ($6H_2O$) and 62 grams of cadmium nitrate ($4H_2O$) were dissolved in two liters of water and 200 grams of commercial kieselguhr added. This mixture was held at 70° C. while a solution of 572 grams of sodium carbonate in six liters of water was added dropwise over a period of eight hours with moderate agitation. The precipitate thus formed was washed five times by decantation using 14 liters of water each time, after which it was filtered and dried at 110° C. A sample of the dry product was compressed into tablets which were broken, and the grains screened to 8 to 14 mesh.

A mixture of 200 grams of ethyl oleate and 15 grams of the reduced catalyst, prepared as described above, was agitated for 5 hours at 325° C., and under a hydrogen pressure of about 3000 pounds per square inch. Hydrogenation of the carbethoxy group proceeded smoothly with the formation of ethanol and a mixture of oleyl and octadecyl alcohols, and the corresponding hydrocarbon products.

Example II

A catalyst composition consisting of a mixture of the chromites of nickel, cobalt, and cadmium in the mol. ratios 45:45:10, respectively, was prepared as follows: 112 grams of cadmium sulfate ($4H_2O$), 524 grams of nickel nitrate ($6H_2O$), and 524 grams of cobalt nitrate were dissolved in 2 liters of water, and the solution heated to 70° C. To this solution was added with stirring 2 liters of a solution containing 608 grams of neutral ammonium chromate, and enough ammonium hydroxide (28% ammonia) added to bring the mixture to neutrality to litmus, after which the precipitate was allowed to settle. The mother liquor was drawn off and the precipitate washed by decantation, filtered, dried at 110° C., and then ignited at 400° C. The product was compressed into tablets which were broken and the grains screened to 8–14 mesh.

100 cc. of the catalyst prepared as described above was used for the hydrogenation of the ethyl esters derived from linseed oil acids. The ester mixture together with hydrogen in the mol. ratio 1:10 was passed over the catalyst at a space velocity of 5 cc. of liquid ester per cc. of catalyst per hour. At 385° C. and a reaction pressure of 2500 pounds per square inch the catalyst converted over 95% of the ester to the corresponding alcohols and hydrocarbons.

The above catalyst was duplicated, substituting indium for cadmium in molecular proportions, and the resulting catalyst composition employed in the hydrogenation of the ethyl esters of linseed oil acids under the conditions described. The yields of alcohols obtained are substantially the same as with the cadmium promoted catalyst.

The conditions described in Examples I and II are also applicable for the hydrogenation of carboxylic acids themselves, particularly those of the aliphatic and hydroaromatic type, and to their amides, acid chlorides, and salts.

*Example III*

A cadmium modified nickel catalyst was prepared as follows: 785 grams of nickel nitrate ($6H_2O$), and 92.4 grams of cadmium nitrate ($4H_2O$) were dissolved in 1500 cc. of water, and a solution consisting of 456 grams of ammonium chromate in 1500 cc. of water added in a slow stream with constant agitation over a period of about 30 minutes. The mixture was then heated with stirring to 70° C., and neutralized by the addition of 230 cc. of 28% aqueous ammonia. The precipitate thus formed was washed 3 times by decantation using 3.5 liters of water each time, after which the precipitate was filtered, and dried at 110° C. The dry precipitate was then heated for 4 hours at 400° C. and passed through a 60-mesh screen.

A mixture of 150 grams of ethyl laurate and 12 grams of the catalyst prepared as described above was agitated for 9 hours in a steel autoclave at 325° C. and under a hydrogen pressure of about 3000 pounds per square inch. 85½ per cent hydrogenation of the carbethoxy group occurred, yielding a clear water-white product which after removal of the ethyl alcohol formed, contained 81.5% of dodecyl alcohol and substantially no hydrocarbons or tarry material.

Analogous results are obtained if, in the above example, a similarly prepared catalyst, but containing tin in place of the corresponding molecular proportion of cadmium, is employed.

The advantage gained by the use of cadmium or tin as a catalyst component was apparent when it was observed that a catalyst consisting only of nickel chromite prepared in the same manner and tested under identical conditions gave only 25.7% carbethoxy reduction, the product of which was a dark-red semi-solid containing 50% of lauric acid, 20% of hydrocarbon, principally dodecane, and considerable dark tarry material, while the dodecyl alcohol content was less than 20%.

*Example IV*

A cadmium modified nickel chromite catalyst prepared as described in Example III above was reduced by heating it in a stream of hydrogen for 17 hours at 450° C.

A mixture of 200 grams of coconut oil and 16 grams of the pre-reduced catalyst just described was agitated for 3.5 hours in a steel autoclave at 325° C., and under a hydrogen pressure of 3000 pounds per square inch. Ninety per cent reduction of the carboxyl group was obtained with the formation of a mixture of fatty alcohols containing from 8 to 18 carbon atoms. The product was a clear water-white oil substantially free from acids, hydrocarbons, and tarry decomposition products.

By contrast, a catalyst consisting only of nickel chromite when tested under similar conditions gave only 28% reduction of the carboxyl groups, the product consisting of a dark-red semi-solid which contained 32% of a mixture of acids, and a relatively high concentration of hydrocarbons, and tar.

*Example V*

A cadmium modified iron catalyst was prepared as follows: 364 grams of ferric nitrate ($9H_2O$), and 30.8 grams of cadmium nitrate ($4H_2O$) were dissolved in 500 cc. of water and a solution consisting of 152 grams of ammonium chromate dissolved in 500 cc. of water was added slowly with constant stirring. 135 cc. of 28% aqueous ammonia was then added to bring the mixture to neutrality, and it was then heated to 70° C. The precipitate thus formed was washed three times by decantation using one liter of water each time, after which it was filtered, dried at 110° C., and heated for 4 hours at 400° C. The product thus obtained was passed through a 60-mesh screen, and reduced by heating in a stream of hydrogen for 20 hours at 475° C.

A mixture of 200 grams of coconut oil and 16 grams of the catalyst so prepared was agitated for 5.5 hours in a steel autoclave at 325° C. under a hydrogen pressure of 3000 pounds per square inch whereby 65% reduction of the carboxyl groups was obtained, the product consisting essentially of a mixture of $C_8$ to $C_{18}$ aliphatic alcohols with relatively small amounts of acid, hydrocarbons, and tar.

*Example VI*

A chromite catalyst consisting of nickel, cobalt, and cadmium chromites in the mol. ratio 45 nickel:45 cobalt:10 cadmium, respectively, was prepared in the manner described in Example III, except that half the nickel nitrate was substituted by the molar equivalent of cobalt nitrate. Instead of preparing the catalyst in the powdered form however, it was compressed into tablets which were then broken into 8–14 mesh granules.

25 cc. of this catalyst was used for the hydrogenation of caprylic acid in the vapor phase. The acid was vaporized and passed together with hydrogen in the mol. ratio of 1:12 over the catalyst at the rate of 15 cc. of the acid per cc. of catalyst per hour at 300° C., and under a pressure of 3000 pounds per square inch. Under these conditions the catalyst gave 98.6% conversion to a product which after removal of the water formed contained 87.1% of octyl alcohol, and less than 1% of hydrocarbon, the remainder consisting of unchanged caprylic acid, and octyl caprylate which was readily converted to the alcohol by further hydrogenation in the liquid phase.

When nickel-cobalt chromite containing no cadmium was used under identical conditions excessive decomposition occurred which resulted in the deposition of quantities of carbon on the catalyst necessitating shutting down the run after a short time.

Example VII 25 cc. of the catalyst described in Example VI was placed in a pressure resistant, stainless steel reaction tube and heated to 250° C., by means of a diphenyl vapor bath. Hydrogen was admitted to the reaction chamber to a pressure of 3000 pounds per square inch and molten lauric acid was pumped at the rate of 125 cc. per hour through a pre-heating space maintained at 250° C., where it was vaporized and passed over the catalyst together with hydrogen in the mol. ratio of 1:10. Under these conditions 93% reduction of the carboxyl group was obtained in a continuous process which yielded 78% of dodecyl alcohol, 1% of hydrocarbon, and a mixture of unchanged acid and a wax residue consisting substantially of dodecyl-laurate.

Example VIII

Using the same catalyst and conditions as employed in Example VII, above, except that the temperature was 335° C., a 70% conversion of oleic acid to a mixture of oleyl and octadecyl alcohols was obtained, with relatively small amounts of hydrocarbons or other decomposition products.

Example IX 25 cc. of the catalyst described in Example VI was placed in a pressure-resistant, stainless steel reaction tube heated by a diphenyl vapor bath. Hydrogen was admitted to the chamber to a pressure of 3000 pounds per square inch and a synthetic mixture of pure fatty acids having the following composition:

| Acid component | Vol.% |
|---|---|
| Caprylic acid ($C_8$) | 6.4 |
| Capric acid ($C_{10}$) | 8.0 |
| Lauric acid ($C_{12}$) | 47.6 |
| Myristic acid ($C_{14}$) | 18.7 |
| Palmitic acid ($C_{16}$) | 8.6 |
| Stearic acid ($C_{18}$) | 10.7 |
| | 100.0 | was pumped in a molten condition at the rate of 125 cc. per hour through a vaporizing chamber maintained at 315° C., and thence over the catalyst, also at 315° C., together with hydrogen in the mol. ratio of 1:10. Under these conditions 92% reduction of the carboxyl group occurred during a run lasting 40 hours, at the end of which time the activity of the catalyst was still unimpaired. Vacuum distillation of the product yielded 85% of a mixture of alcohols corresponding in molecular weight to the acids present in the synthetic mixture, and only 1.2% of hydrocarbons together with a small amount of unchanged acids and waxy esters.

Example X

In a run similar to that described in Example IX above, using the same catalyst, and identical conditions of temperature, pressure, and space velocity, a technical mixture of fatty acids obtained by the hydrolysis of coconut oil, was hydrogenated in the vapor phase in a continuous process of 72 hours duration with substantially no impairment of catalyst activity. Under these conditions a 93% reduction in saponification value of the acids was obtained, the product yielding on vacuum distillation 71% of a mixture of alcohols containing 8 to 18 carbon atoms in the same relative proportions as the acids in the original mixture.

Example XI

A cadmium modified cobalt catalyst was prepared by the procedure described in Example V except that the molar equivalent of cobalt nitrate was substituted in place of the ferric nitrate.

A mixture of 150 grams of the ethyl ester of lauric acid, and 12 grams of the catalyst was agitated for 7 hours in a steel autoclave at 325° C., under 3000 pounds hydrogen pressure per square inch. Sixty-three per cent conversion of the ester to dodecyl alcohol occurred, the product consisting of a clear, slightly greenish colored liquid containing in addition to dodecyl and ethyl alcohols and unchanged ester, approximately 9% of lauric acid and a small amount of hydrocarbon.

By contrast a catalyst consisting only of cobalt chromite when tested under similar conditions gave a similar conversion of ester to alcohol, but the product was a dark-red semi-solid containing considerable quantities of acid, hydrocarbons, and tar.

The catalysts of the present invention comprise substantially the elements iron, cobalt, or nickel, which are classified in the upper tier of the eighth group of the periodic table of Mendeleeff. They have atomic numbers in the range of 26 to 28, inclusive, and, on account of their similarity in chemical properties, are often referred to as the ferrous metals. Where the term "ferrous metal" is used in the specification, or in the claims it will be intended to include only iron, cobalt, and nickel. In the catalysts of this invention, the iron, cobalt, or nickel may exist in the form of oxides or other compounds, or in a wholly or partially reduced condition. Besides the addition of modifying agents in the manner disclosed, the iron, cobalt, and nickel-containing catalysts may be employed advantageously in combinations with each other.

Suitable modifying agents for ferrous metal catalysts may also comprise the non-ferrous metals of atomic numbers 80 to 83, inclusive, consisting of mercury, thallium, lead, and bismuth in addition to the preferred elements cadmium, indium, and tin. While we make no claim to having discovered the mechanism of the modifying action on ferrous metal catalysts, we have perceived that the non-ferrous metals named above have certain properties in common which may contribute to the desired effect. All are metals which form oxides that are very readily reduced with hydrogen in the dry state at temperatures below 350° C., and may, therefore, be termed easily or readily reducible oxides. Secondly, all of the modifying agents are relatively low melting metals, the melting points of which are also below 350° C. Consideration of the temperatures indicated in the examples shows that under the conditions ordinarily employed, the modified ferrous metal catalysts may contain metallic modifiers in a liquid condition. The atomic numbers of the non-ferrous modifying metals fall into two groups: the preferred group, cadmium, indium, and tin, having atomic numbers of 48 to 50 inclusive, and the second, but less preferred, group consisting of mercury, thallium, lead, and bismuth, having atomic numbers of 80 to 83, inclusive.

The modified catalysts which are the subject of this invention may be prepared by a number of different methods without departing from the spirit or scope of the invention. The methods used may involve mixing, grinding, ignition or co-precipitation of the various catalyst components. In the examples, we have indicated that the catalyst compositions may be formed as precipitates by adding suitable reagents to mixed solutions of the appropriate salts. The precipitating agent may be an alkali or a salt which will deposit an insoluble hydroxide, carbonate, or salt of an oxygen containing acid. Good results have been obtained through the use of soluble chromates as precipitating agents. When ammonium chromate is used a mixture of double ammonium salts is formed which on ignition yields mixed chromites of high catalytic efficacy. When preparing the catalysts in the form of hydroxides or carbonates it may be desirable to use an inert supporting material such as silica gel, kieselguhr, or activated charcoal.

The amount of modifying agent may be varied within wide limits. In general, suitable concentrations are found to be between 1 and 25 mols per cent of the total base metal used.

These catalysts may be used in the reduced or unreduced state. If reduced, the reduction may be carried out with any suitable reducing medium such as hydrogen, carbon monoxide, or alcohol, or in any of these media diluted with an inert gas such as nitrogen or carbon dioxide. In many cases, the catalysts may be reduced in the vapors or liquids of the reacting materials. The temperature of reduction is preferably about 450-475° C., but satisfactory reductions may be carried out at temperatures varying from 300° C. to 550° C.

The catalysts of this invention are capable of use for the hydrogenation of organic carboxylic compounds such as acids, esters, and anhydrides. They may be used in the vapor or liquid phase and within a wide range of pressures. In the hydrogenation of carboxylic compounds the operative range of temperature falls within the limits of 200-400° C. In liquid phase reactions such as the hydrogenation of ethyl laurate or coconut oil, the preferred temperature range is 275-325° C., while in the vapor phase the temperature depends somewhat on the degree of volatility of the material to be hydrogenated, but ordinarily temperatures of 300-375° C. are preferred. The preferred pressure is about 3000 pounds per square inch, although in particular cases where a material is especially resistant to hydrogenation, or when serious catalyst poisoning problems exist, it may be desirable to employ pressures as high as 6000 to 10,000 pounds per square inch. It is seldom desirable to work at pressures lower than 1500 pounds. A considerable excess of hydrogen should always be employed, a suitable mol. ratio of hydrogen to material to be hydrogenated being about 10:1.

Although catalysts of the type disclosed in this invention may be used advantageously in any catalytic reaction involving the hydrogenation or dehydrogenation of organic carbon compounds, they are particularly useful in the hydrogenation of carboxylic compounds. Thus, aliphatic esters, acids, or their anhydrides having more than two carbon atoms per carboxyl group may be converted to the corresponding alcohols in good yields. Glycerides such as coconut, castor or linseed oils, as well as the mixtures of acids derived therefrom, and waxes such as sperm oil, may also be hydrogenated to the corresponding alcohols.

The principal advantage to be gained in the use of the catalysts disclosed in this invention lies in the fact that the modifying agents used destroy the inherent tendency of the ferrous metals to cause degradation of useful products to carbon, gaseous compounds, and liquid products having relatively small commercial value. An advantage of equal worth is that the use of the prescribed agents greatly increases the activity of catalysts of the ferrous metal type toward the production of useful products.

For example, the inclusion of 10 mols per cent of cadmium in a nickel chromite catalyst increased the conversion of coconut oil in the liquid phase to the corresponding alcohols from 28% to 90%.

Other advantages accruing from the use of these promoted catalysts are: they inhibit the tendency of iron and cobalt to cause dehydration of alcohols to ethylene and water, and contribute to a greater ease of control resulting from the elimination of erratic thermal effects, plugging due to carbon deposition, etc.

The above description and specific examples are illustrative only, and are not intended to limit the scope of the invention. Any modification thereof or variation therefrom, is intended to be included within the scope of the claims.

We claim:

1. In the process for catalytically hydrogenating or dehydrogenating an organic compound selected from the group consisting of carboxylic acids, their esters, and their anhydrides, the step which comprises carrying out said catalytic reaction in the presence of a hydrogenating-dehydrogenating catalyst comprising essentially a member selected from the group consisting of the ferrous group, their oxides and chromites, modified by a member selected from the class consisting of the metal and the chromite of a low-melting hydrogenating non-ferrous metallic element selected from the group consisting of cadmium, indium, tin, mercury, thallium, lead, and bismuth.

2. In the process for catalytically hydrogenating or dehydrogenating an organic compound selected from the group consisting of carboxylic acids, their esters, and their anhydrides, the step which comprises carrying out said catalytic reaction in the presence of a hydrogenating-dehydrogenating catalyst comprising essentially a member selected from the group consisting of the ferrous group, their oxides and chromites, modified by a member selected from the class consisting of the metal and the chromite of an element having an atomic number of from 48 to 50, inclusive.

3. In a process for the catalytic hydrogenation of a carboxyl compound, the step which comprises carrying out said reaction in the presence of a hydrogenating catalyst comprising essentially a ferrous metal modified by a member selected from the class consisting of the metal and the chromite of a low-melting hydrogenating non-ferrous metal selected from the group consisting of cadmium, indium, tin, mercury, thallium, lead, and bismuth.

4. In a process for the catalytic hydrogenation of a carboxyl compound, the step which comprises carrying out said reaction in the presence of a hydrogenating catalyst comprising essentially a ferrous metal modified by a member selected from the class consisting of the metal and the chromite of an element having an atomic number of from 48 to 50, inclusive.

5. The process in accordance with claim 2 characterized in that the reaction is carried out at a temperature within the range of 200° to 400° C.

6. The process in accordance with claim 3 characterized in that the reaction is carried out at a temperature within the range of 200° C. to 400° C.

7. The process in accordance with claim 2 characterized in that the reaction is carried out in the presence of an excess of hydrogen.

8. The process in accordance with claim 2 characterized in that the reaction is carried out at a pressure in excess of 1500 pounds per square inch.

9. The process in accordance with claim 2 characterized in that the reaction is carried out in the liquid phase and at a temperature of about 275°–325° C.

10. The process in accordance with claim 2 characterized in that the reaction is carried out in the gas phase at a temperature of about 300°–375° C.

11. The process in accordance with claim 2 characterized in that the reaction is carried out in the presence of an excess of hydrogen at a temperature between 200° and 400° C., and at a pressure of about 3000 pounds per square inch.

12. In a process for the catalytic hydrogenation of a carboxylic compound, the step which comprises carrying out said reaction in the presence of a hydrogenating catalyst comprising essentially a ferrous metal modified by cadmium.

13. In a process for the catalytic hydrogenation of a carboxyl compound, the step which comprises carrying out said reaction in the presence of a hydrogenating catalyst comprising essentially cadmium chromite and a chromite of a ferrous metal.

14. In a process for the catalytic hydrogenation of a carboxyl compound, the step which comprises carrying out said reaction in the presence of a hydrogenating catalyst comprising essentially nickel modified by cadmium.

15. In a process for the catalytic hydrogenation of a carboxyl compound, the step which comprises carrying out said reaction in the presence of a hydrogenating catalyst comprising essentially cadmium chromite and nickel chromite.

16. In a process for the catalytic hydrogenation of a carboxyl compound, the step which comprises carrying out said reaction in the presence of a hydrogenating catalyst comprising essentially cobalt modified by cadmium.

17. In a process for the catalytic hydrogenation of a carboxyl compound, the step which comprises carrying out said reaction in the presence of a hydrogenating catalyst comprising essentially cadmium chromite and cobalt chromite.

18. In a process for the catalytic hydrogenation of a carboxyl compound, the step which comprises carrying out said reaction in the presence of a hydrogenating catalyst comprising essentially cadmium chromite, cobalt chromite, and nickel chromite.

19. In a process for the catalytic hydrogenation of a carboxyl compound, the step which comprises carrying out said reaction in the presence of a hydrogenating catalyst comprising essentially iron modified by cadmium.

20. In a process for the catalytic hydrogenation of a carboxyl compound, the step which comprises carrying out said reaction in the presence of a hydrogenating catalyst comprising essentially cadmium chromite and iron chromite.

21. In a process of effecting the carboxyl hydrogenation of a carboxylic compound to an alcohol, the step which comprises reacting a carboxylic compound with hydrogen in the presence of nickel-cadmium chromite.

HERRICK R. ARNOLD.
WILBUR A. LAZIER.